(12) United States Patent
Porte et al.

(10) Patent No.: US 8,172,037 B2
(45) Date of Patent: May 8, 2012

(54) COATING FOR ACOUSTIC TREATMENT THAT INTEGRATES THE FUNCTION OF HOT-AIR TREATMENT OF FROST

(75) Inventors: Alain Porte, Colomiers (FR); Jacques Lalane, Saint Orens de Gameville (FR)

(73) Assignee: Airbus Operations SAS, Toulouse (FR)

( * ) Notice: Subject to any disclaimer, the term of this patent is extended or adjusted under 35 U.S.C. 154(b) by 353 days.

(21) Appl. No.: 12/663,608

(22) PCT Filed: Jun. 3, 2008

(86) PCT No.: PCT/FR2008/050974
§ 371 (c)(1),
(2), (4) Date: Dec. 8, 2009

(87) PCT Pub. No.: WO2009/001002
PCT Pub. Date: Dec. 31, 2008

(65) Prior Publication Data
US 2010/0181420 A1    Jul. 22, 2010

(30) Foreign Application Priority Data
Jun. 8, 2007   (FR) ...................... 07 55586

(51) Int. Cl.
*B64D 15/04*    (2006.01)
(52) U.S. Cl. ..................... 181/214; 181/293; 244/134 B
(58) Field of Classification Search .................. 181/210, 181/213, 214, 292, 293; 244/1 N, 134 B; 415/119
See application file for complete search history.

(56) References Cited

U.S. PATENT DOCUMENTS

| | | | |
|---|---|---|---|
| 3,516,895 A | | 6/1970 | Hartman |
| 3,933,327 A | * | 1/1976 | Cook et al. ................ 244/134 B |
| 5,841,079 A | | 11/1998 | Parente |
| 5,934,611 A | * | 8/1999 | Tindell et al. ............... 244/53 B |
| 6,698,691 B2 | * | 3/2004 | Porte .......................... 244/134 B |
| 2005/0284690 A1 | * | 12/2005 | Proscia et al. ................ 181/214 |
| 2007/0034447 A1 | * | 2/2007 | Proscia et al. ................ 181/290 |

FOREIGN PATENT DOCUMENTS
EP    1 103 462    5/2001

OTHER PUBLICATIONS
International Search Report Nov. 6, 2008, from corresponding PCT application.

* cited by examiner

*Primary Examiner* — Jeremy Luks
(74) *Attorney, Agent, or Firm* — Young & Thompson

(57) ABSTRACT

The invention relates to a coating for acoustic treatment at the surface of an aircraft, in particular at the leading edge such as the air intake of an aircraft nacelle, said coating including an acoustically resistive layer (28), at least one cellular structure (30) and a reflective layer (32), characterized in that it comprises ducts (34) provided between said cellular structure (30) and the acoustically resistive structure (28), the ducts being each defined by a wall (36) separate from the walls of the cellular structure (30) and one end of the ducts being connected to a hot air supply.

16 Claims, 5 Drawing Sheets

Figure 1:
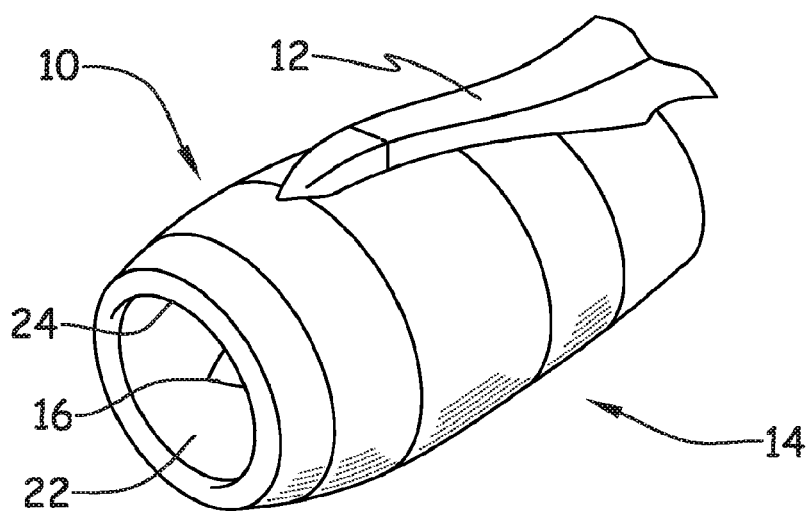

COATING FOR ACOUSTIC TREATMENT THAT INTEGRATES THE FUNCTION OF HOT-AIR TREATMENT OF FROST

This invention relates to a coating for acoustic treatment that integrates the function of hot-air treatment of frost, whereby said coating is designed in particular for a leading edge of an aircraft, and more particularly for an air intake of an aircraft nacelle.

To limit the impact of noise pollution close to airports, the international standards are increasingly restrictive as far as sound emissions are concerned.

Techniques have been developed to reduce the noise that is emitted by an aircraft, in particular by arranging, at the walls of the pipes of the nacelles, coatings that are intended to absorb a portion of the sound energy, in particular by using the principle of Helmholtz resonators. In a known manner, this acoustic coating comprises—from the outside to the inside—an acoustically resistive porous layer, an alveolar structure, and a reflective layer that is impermeable to sound waves so that the coating is effective.

At the moment, because of various constraints, for example shaping or compatibility with other equipment, the extent of the treated surfaces is limited. Thus, the coating is not very compatible with the systems that make it possible to prevent the formation and/or the accumulation of ice and/or frost that are necessary in these zones.

These systems are divided into two large families, whereby the first that are called defrosting systems make it possible to limit the formation of ice and/or frost, and whereby the second that are called de-icing systems limit the accumulation of ice and/or frost and act on both the ice and/or frost that form. Hereinafter, a frost treatment system or process is defined as a defrosting system or process or a de-icing system or process.

This invention relates more particularly to a process for frost treatment that consists in using the hot air that is taken from the engine and delivered at the inside walls of the leading edges. This high-quality system is not very compatible with the acoustic treatment coating to the extent that the latter is relatively thick and consists of cells that contain air and that act as an insulating material.

So as to attempt to make the acoustic and frost treatments compatible, a solution that is described in the documents EP-1,103,462 and U.S. Pat. No. 5,841,079 provides holes in the reflective wall so that the hot air penetrates the cells of the acoustic coating.

This solution is not satisfactory, however, for the following reasons:

The cells of the alveolar structure that comprise one or more holes at the reflective layer are less capable in terms of acoustic treatment, whereby the waves dissipate less well in said cells. To reduce this alteration, one solution consists in reducing the cross-sections of holes. In this case, the air volume at a constant flow rate is reduced, making the defrosting less effective. Furthermore, these holes with reduced cross-sections can be plugged more easily, which eliminates the defrosting function in the corresponding zone.

According to another problem, to the extent that the alveolar structure that consists of a honeycomb is deformed during its installation, certain holes of the reflective layer can be arranged to the right of a side wall delimiting two cavities. In this case, the operation in terms of the acoustic treatment of two cavities is altered, and the defrosting function is also altered, whereby the hole is partially blocked by the wall.

Finally, according to another problem, since a pressure balance forms inside the rim of the air intake, it is not possible to isolate certain portions of the rim so as to blow in there a stronger defrosting air pressure, in particular at the spots where the frost is deposited in larger quantities. Furthermore, this solution requires good sealing between cells, which requires excellent sealing between the walls of the alveolar structure and the acoustically resistive structure and said walls and the reflective layer.

The purpose of this invention is to overcome the drawbacks of the prior art by proposing a coating that makes acoustic treatment and hot-gas treatment of frost compatible, whereby said coating is designed in particular for a leading edge and more particularly for a nacelle air intake.

For this purpose, the invention has as its object a coating for acoustic treatment that is connected at one surface of an aircraft, in particular at a leading edge such as an air intake of an aircraft nacelle, whereby said coating comprises an acoustically resistive layer, at least one alveolar structure, and a reflective layer, characterized in that it comprises pipes that are placed between said alveolar structure and the acoustically resistive structure, whereby said pipes are each delimited by a wall that is separate from the walls of the alveolar structure and one of the ends of the pipes is connected to a hot air intake.

Figure 2:
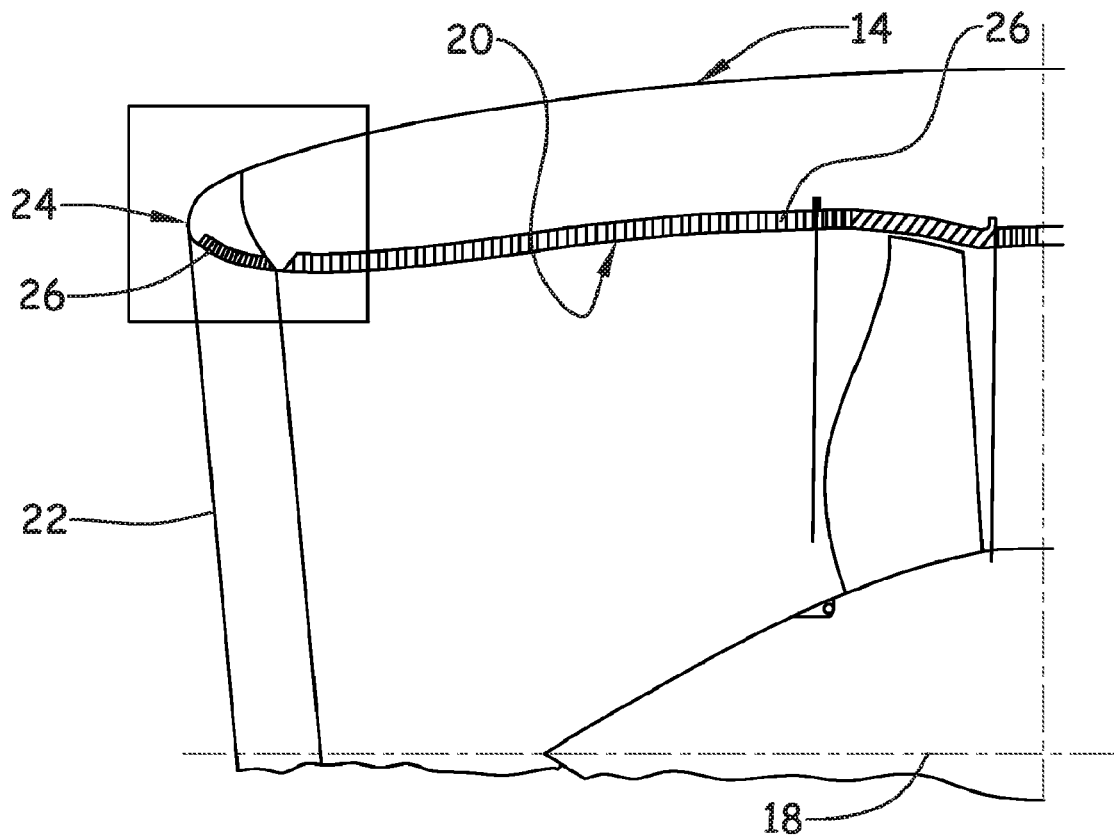
Figure 3:
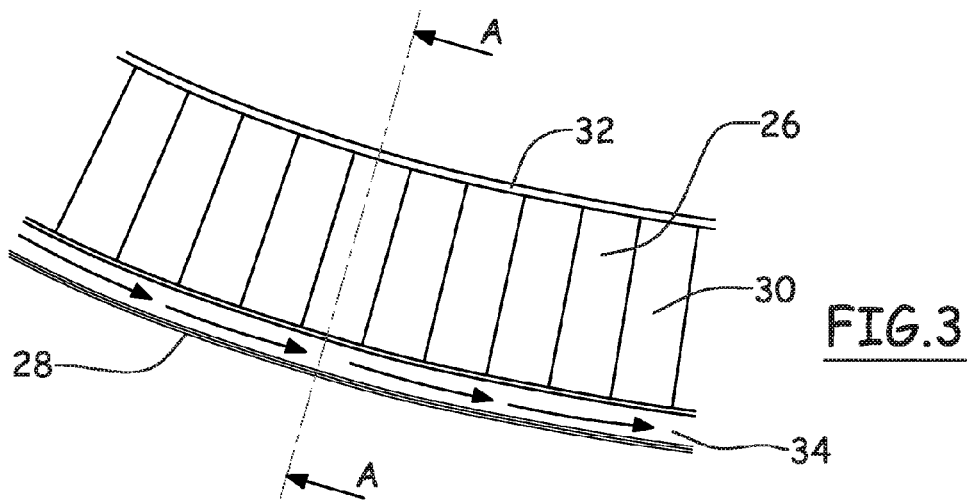
Figure 4:
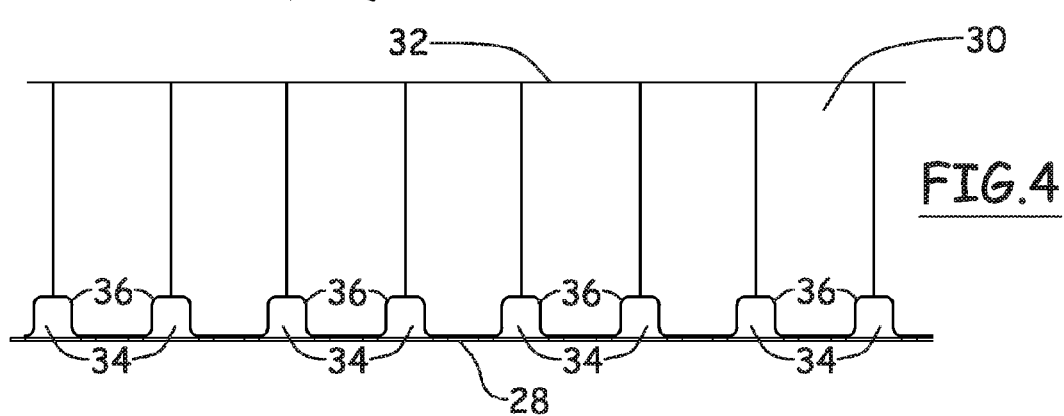
Figure 5:
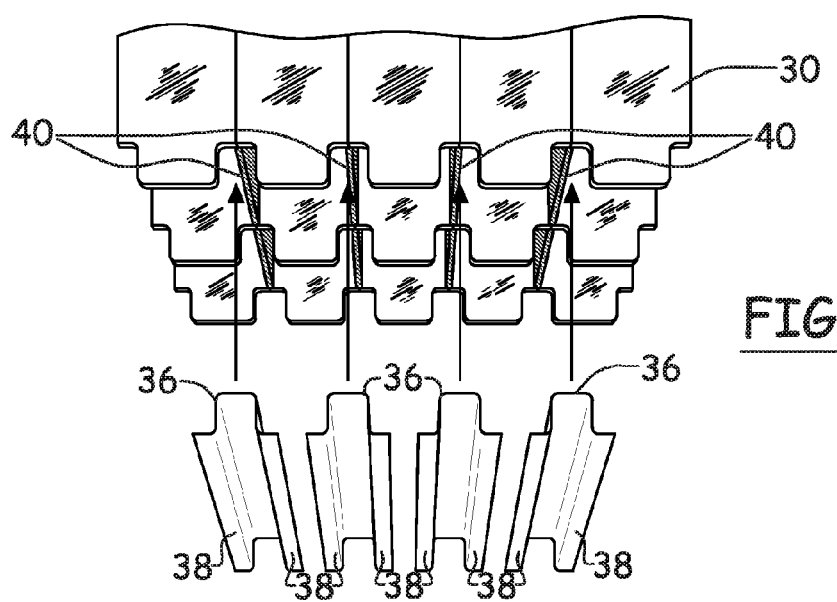
Figure 6:
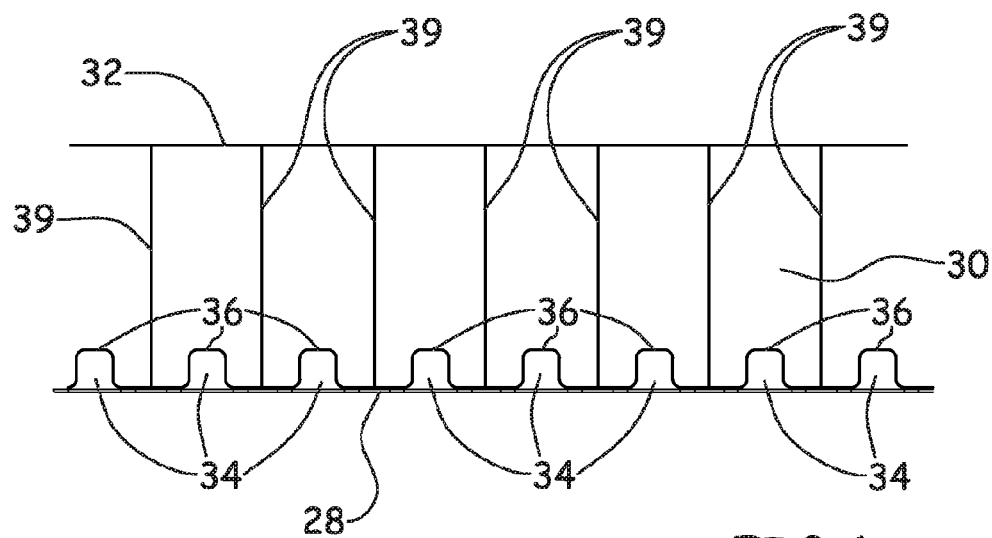
Figure 7:
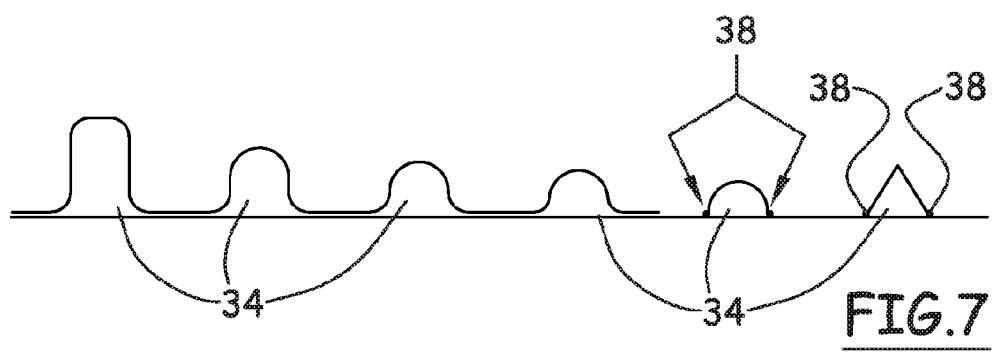
Figure 8:
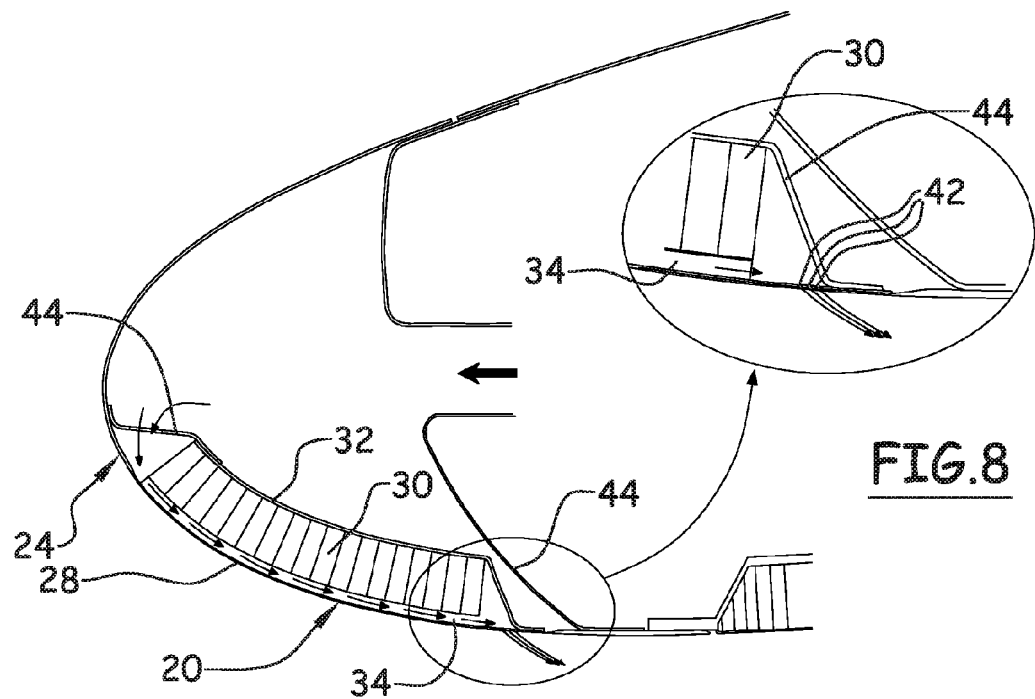
Figure 9:
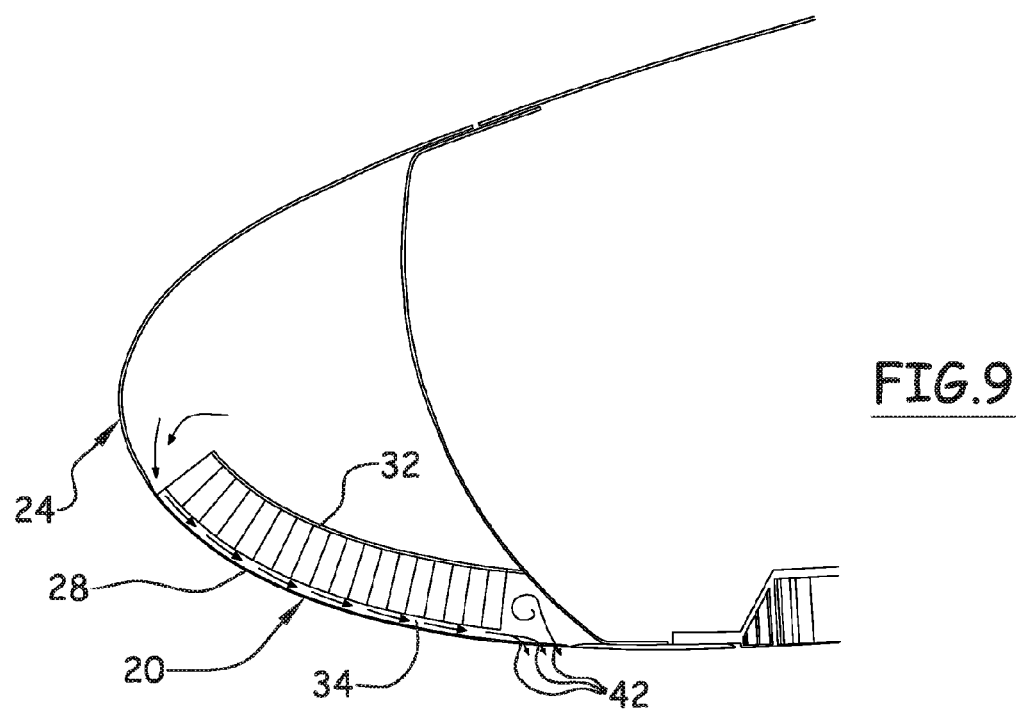
Figure 10:
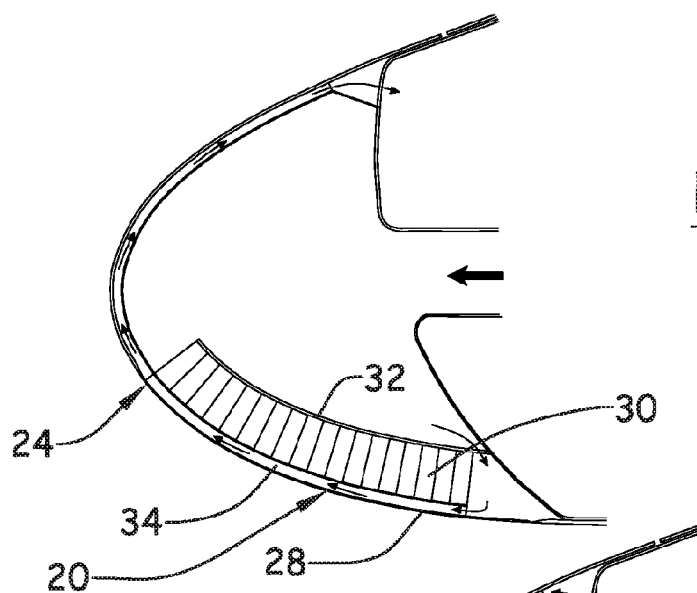
Figure 11:
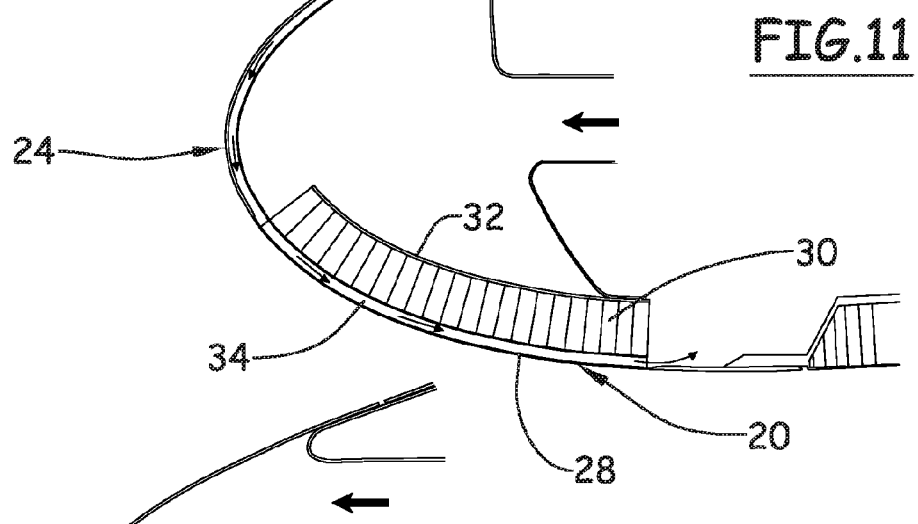
Figure 12:
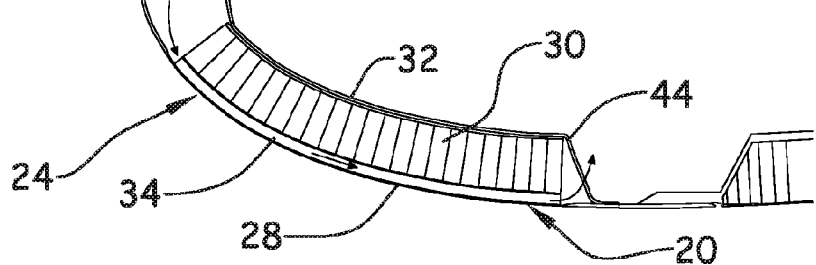

Other characteristics and advantages will emerge from the following description of the invention, a description that is provided only by way of example, with regard to the accompanying drawings, in which:

FIG. 1 is a perspective view of a propulsion unit of an aircraft,

FIG. 2 is a longitudinal cutaway that illustrates a portion of an air intake of a nacelle, FIG. 3 is a longitudinal cutaway of a portion of the acoustic coating according to the invention, FIG. 4 is a cutaway along line A-A of FIG. 3 that illustrates a portion of the acoustic coating according to a first variant, FIG. 5 is a perspective view that illustrates in details the alveolar structure and the channels for defrosting according to the variant of FIG. 4, FIG. 6 is a cutaway along line A-A of FIG. 3 that illustrates a portion of the acoustic coating according to a second variant, FIG. 7 is a diagram that illustrates various shapes that can be considered for the channels, FIG. 8 is a cutaway that illustrates a first variant of an air intake that is equipped with an acoustic coating according to the invention, FIG. 9 is a cutaway that illustrates a second variant of an air intake that is equipped with an acoustic coating according to the invention, FIG. 10 is a cutaway that illustrates a third variant of an air intake that is equipped with an acoustic coating according to the invention, FIG. 11 is a cutaway that illustrates a fourth variant of an air intake that is equipped with an acoustic coating according to the invention, and FIG. 12 is a cutaway that illustrates a fifth variant of an air intake that is equipped with an acoustic coating according to the invention.

This invention is now described as applied to an air intake of a propulsion unit of an aircraft. However, it can apply to various leading edges of an aircraft where acoustic treatment and frost treatment are performed, for example the leading edges of the wings.

Hereinafter, frost is defined as both frost and ice, of all types, all structures, and all thicknesses.

FIG. 1 shows a propulsion unit 10 of an aircraft that is connected under the wing by means of a mast 12. However, this propulsion unit could be connected to other zones of the aircraft.

This propulsion unit comprises a nacelle 14 in which a power plant that drives a fan 16 is arranged essentially concentrically. The longitudinal axis of the nacelle is referenced 18.

The nacelle 14 comprises an inside wall 20 that delimits a pipe with an air intake 22 at the front.

The top part 24 of the air intake 22 describes an essentially circular shape that extends in a plane that can be approximately perpendicular to the longitudinal axis 18, or not perpendicular, with the top part located just before 12 o'clock. However, other air intake shapes can be considered.

Hereinafter, aerodynamic surface means the shell of the aircraft that is in contact with the aerodynamic flow.

To limit the impact of noise pollution, a coating 26 whose purpose is to absorb a portion of the sound energy, in particular by using the principle of Helmholtz resonators, is provided in particular at aerodynamic surfaces. In a known manner, this acoustic coating, also called acoustic panel, comprises—from the outside to the inside—an acoustically resistive structure 28, at least one alveolar structure 30, and a reflective layer 32.

Layer or structure is defined as one or more layers that may or may not be of the same type.

The acoustically resistive structure 28 is a porous structure that has a dissipative role, partially transforming the acoustic energy of the sound wave that passes through it into heat.

According to one embodiment, the acoustically resistive structure 28 comprises at least one porous layer in the form of, for example, a cloth that may or may not be metal, such as a wire mesh, and at least one structural layer, for example, sheet metal or a composite with oblong holes or microperforations.

The reflective structure 32 is impermeable to sound waves and does not comprise any orifice that can affect the acoustic treatment.

The alveolar structure 30 corresponds to a volume that is delimited by, on the one hand, a first imaginary surface to which the reflective layer 32 can be connected, and, on the other hand, a second imaginary surface to which the acoustically resistive layer 28 can be connected.

The distance that separates the first imaginary surface and the second imaginary surface cannot be constant. Thus, this distance can be more significant at the rim of the air intake so as to impart to said structure a greater resistance in particular to impacts.

The alveolar structure 30 comprises a number of pipes that emerge, on the one hand, at the first surface, and, on the other hand, at the second surface. These pipes are blocked by, on the one hand, the acoustically resistive porous structure, and, on the other hand, the reflective layer so as to each form a cell.

Preferably, two adjacent pipes are separated by a side wall.

According to a first embodiment, the alveolar structure 30 consists of a honeycomb. Thus, the pipes have a hexagonal shape, and the adjacent pipes are separated by side walls.

According to a second embodiment, the alveolar structure 30 comprises a series of first bands that are arranged at the secant surfaces, whereby said first bands are non-secant and spaced apart, and at least a second series of second bands that are arranged at the secant surfaces, whereby said second bands are non-secant and spaced apart. The first bands are secant with the second bands so as to delimit a pipe between, on the one hand, two adjacent first bands, and, on the other hand, two adjacent second bands. Secant surface is defined as a plane or a surface that is secant with the first imaginary surface and with the second imaginary surface.

Thus, pipes with four lateral surfaces are obtained.

To simplify the design, the first bands will be arranged in radial planes that contain the longitudinal axis of the nacelle.

To obtain a more rigid structure, the second bands will be arranged so that they are essentially perpendicular to the first bands so as to obtain pipes with square or rectangular sections. This solution also makes it possible to simplify the design.

These various layers and structures are not described in more detail because they are known to one skilled in the art.

Also to reduce noise pollution, the air intake 22 comprises an acoustic coating 26 over at least a portion of the aerodynamic surface. According to one embodiment, this acoustic coating 26 extends from the inside wall 20 of the nacelle up to the top portion 24 of the air intake over the entire periphery of the air intake.

To limit the formation of frost or to prevent its accumulation, the air intake 22 comprises means for treating frost, using hot air that is taken from the engine to heat the aerodynamic surface.

According to the invention, the acoustic coating 26 comprises pipes or channels 34 that are placed between the alveolar structure 30 and the acoustically resistive structure 28, whereby the pipes are each delimited by a wall 36 that is separate from the walls of the alveolar structure 30 and whereby one of the ends of the pipes is connected to a hot air intake.

This solution makes it possible to limit the risks of communication between the inside of the pipes and the cells of the alveolar structure 30 and therefore the risks of disruptions of acoustic treatment.

According to another advantage, the hot air occupies a volume that is clearly less than the solutions of the prior art, according to which it occupies the volume of certain cells of the alveolar structure, which makes it possible to obtain, on the one hand, a better concentration of hot air against the wall to be defrosted, reinforcing the effectiveness of defrosting, and, on the other hand, a higher pneumatic pressure that limits the risk of pressure inside the structure being less than that of the outside and therefore the penetration of the outside air inside the defrosting system.

According to another advantage, the hot air is in permanent contact with the skin to be defrosted, which makes it possible to improve the exchanges and to reduce the temperature of the hot air that is delivered at the outlet of the defrosting system; this makes it possible to discharge the air without the risk of the wall that it passes being burned, in particular when this wall is made of a heat-sensitive material such as a composite.

Advantageously, the pipes 34 are arranged carefully relative to the cells of the alveolar structure so as not to affect the effectiveness of the acoustic treatment, in particular by preserving a homogenous open surface ratio for the acoustically resistive structure.

According to a variant that is illustrated in FIG. 7, the pipes 34 are obtained by shaping a layer with concave parts that delimit the pipes, whereby said layer is inserted between the acoustically resistive layer and the alveolar structure, whereby the parts of the non-deformed layer are flattened against the acoustically resistive layer 28. According to another variant that is illustrated in FIG. 7, the pipes 34 are separate, and they each have a concave section with ends 38 on both sides that are able to be connected to the inside surface of the acoustically resistive structure.

The pipes or the layer that forms the pipes can be made with one or more metal or composite layers.

According to one embodiment that is illustrated in FIGS. 4 and 5, the pipes 34 are arranged to the right of certain walls that delimit the cells of the alveolar structure, whereby the pipes are preferably arranged symmetrically relative to said walls.

According to another embodiment that is illustrated in FIG. 6, the pipes 34 are arranged to the right of certain cells, and their walls 36 are separate from the walls 39 of the cells of the alveolar structure 30. This arrangement makes it possible to obtain a more resistant panel to the extent that the walls that delimit the cells do not rest on the pipes but on the acoustically resistive layer.

According to the variants that are illustrated in FIG. 7, the pipes 34 can have different cross-sections in the shape of a U, V or omega with a more or less significant height. However, the invention is not limited to the cross-sections that are illustrated.

Preferably, the pipes 34 are approximately rectilinear to limit the differential heads. According to one embodiment, the pipes 34 are parallel to one another and are arranged in radial planes that pass through the axis of the nacelle. This configuration simplifies the circulation of the hot air and limits the increased consumption of the aircraft.

In addition, on the surface that can be flattened against the acoustically resistive structure, the alveolar structure 30 comprises grooves 40 whose shapes are adapted to those of the pipes, as illustrated in FIG. 5.

According to another characteristic, the density of the pipes 34 can be variable so as to adjust the defrosting, in particular by spacing the pipes more or less or by making the cross-sections of the pipes vary.

According to the variants, the pipes 34 have a length that is adjusted to that of the acoustic panel as illustrated in FIGS. 8, 9 and 12 or extend beyond said acoustic panel, in particular upstream, as illustrated in FIGS. 10 and 11, to better channel the hot air upon contact with the surface to be defrosted and to increase the rigidity of the aerodynamic surface at the air intake by acting as stiffeners.

According to the variants, the hot air can be delivered via perforations or microperforations 42 that are made in the acoustically resistive structure, preferably inclined to orient the flow that exits in the direction of the outside flow that enters into the nacelle, as illustrated in FIGS. 8 and 9, or it can be delivered to the inside of the nacelle to exit more downstream.

According to the variants, the intake of the hot air is connected to the pipes so that the hot air flows into the pipes in the same direction as the outside air that enters into the nacelle, as illustrated in FIGS. 8, 9, 11 and 12 or in counter-current as illustrated in FIG. 10.

According to one embodiment, a frame 44 can be connected at least one of the edges of the acoustic panel to distribute the hot air into the various pipes 34 and/or to collect the hot air at the end that is downstream from the pipes.

The invention claimed is:

1. Coating for acoustic treatment that is connected at one surface of an aircraft, in particular at a leading edge such as an air intake of an aircraft nacelle, whereby said coating comprises an acoustically resistive layer (28), at least one alveolar structure (30), and a reflective layer (32), characterized in that it comprises pipes (34) that are placed between said alveolar structure (30) and the acoustically resistive structure (28), whereby the pipes are each delimited by a wall (36) that is separate from the walls of the alveolar structure (30) and whereby one of the ends of the pipes is connected to a hot air intake.

2. Coating for acoustic treatment according to claim 1, wherein the pipes (34) are separate and each have a concave section with ends (38) on both sides that are connected to the inside surface of the acoustically resistive structure.

3. Coating for acoustic treatment according to claim 1, wherein the pipes (34) are obtained by the shaping so as to form pipes (34) with a layer that is inserted between the alveolar structure (30) and the acoustically resistive layer (28).

4. Coating for acoustic treatment according to claim 2, wherein the alveolar structure (30) comprises grooves (40) on the surface that can be flattened against the acoustically resistive structure (28), and the shapes of said grooves are adapted to those of the pipes.

5. Coating for acoustic treatment according to claim 1, wherein the pipes (34) are essentially rectilinear and parallel to one another.

6. Aircraft nacelle that comprises an air intake (22) that incorporates a coating for acoustic treatment according to claim 1.

7. Aircraft nacelle according to claim 6, wherein the pipes (34) extend upstream from the coating for acoustic treatment to form stiffeners.

8. Aircraft nacelle according to claim 6, wherein the acoustically restive structure comprises perforations to deliver the air that is used for defrosting.

9. Aircraft nacelle according to claim 6, wherein the hot air intake is connected to pipes so that the hot air flows in the pipes in the same direction as the outside air that enters into the nacelle.

10. Aircraft nacelle according to claim 6, wherein the hot air intake is connected to pipes so that the hot air flows into the pipes in counter-current relative to the outside air that enters into the nacelle.

11. Coating for acoustic treatment according to claim 3, wherein the alveolar structure (30) comprises grooves (40) on the surface that can be flattened against the acoustically resistive structure (28), and the shapes of said grooves are adapted to those of the pipes.

12. Aircraft nacelle according to claim 7, wherein the acoustically restive structure comprises perforations to deliver the air that is used for defrosting.

13. Aircraft nacelle according to claim 7, wherein the hot air intake is connected to pipes so that the hot air flows in the pipes in the same direction as the outside air that enters into the nacelle.

14. Aircraft nacelle according to claim 8, wherein the hot air intake is connected to pipes so that the hot air flows in the pipes in the same direction as the outside air that enters into the nacelle.

15. Aircraft nacelle according to claim 7, wherein the hot air intake is connected to pipes so that the hot air flows into the pipes in counter-current relative to the outside air that enters into the nacelle.

16. Aircraft nacelle according to claim 8, wherein the hot air intake is connected to pipes so that the hot air flows into the pipes in counter-current relative to the outside air that enters into the nacelle.

* * * * *